United States Patent [19]

Taguchi

[11] Patent Number: 5,227,675
[45] Date of Patent: Jul. 13, 1993

[54] VOLTAGE GENERATOR FOR A SEMICONDUCTOR INTEGRATED CIRCUIT

[75] Inventor: Masao Taguchi, Kawasaki, Japan
[73] Assignee: Fujitsu Limited, Kawasaki, Japan
[21] Appl. No.: 761,548
[22] Filed: Sep. 18, 1991

[30] Foreign Application Priority Data

Sep. 20, 1990 [JP] Japan .................. 2-250501

[51] Int. Cl.⁵ ............................................. H03K 3/01
[52] U.S. Cl. .................. 307/296.1; 307/296.2; 307/296.6; 307/296.7; 307/296.8
[58] Field of Search .............. 307/296.1, 196.2, 296.6, 307/296.7, 296.8

[56] References Cited

U.S. PATENT DOCUMENTS

| | | | |
|---|---|---|---|
| 4,471,290 | 9/1984 | Yamaguchi | 307/296.2 |
| 4,739,191 | 4/1988 | Puar | 307/296.2 |
| 4,794,278 | 12/1988 | Vajdic | 307/296.2 |
| 4,820,936 | 4/1989 | Veendrick et al. | 307/296.2 |
| 4,843,256 | 6/1989 | Scade et al. | 307/296.2 |
| 4,890,011 | 12/1989 | Miyatake | 307/296.2 |
| 4,961,007 | 10/1990 | Kumanoya et al. | 307/296.8 |
| 5,003,197 | 3/1991 | Nojima et al. | 307/296.2 |

FOREIGN PATENT DOCUMENTS

0032588 7/1981 European Pat. Off. .

*Primary Examiner*—William L. Sikes
*Assistant Examiner*—Scott A. Ouellette
*Attorney, Agent, or Firm*—Nikaido, Marmelstein, Murray & Oram

[57] ABSTRACT

A semiconductor integrated circuit comprises a chip, an oscillator provided on the for producing an alternate current with a controlled amplitude that is determined by the drive voltage, a rectifier provided on the chip for receiving and converting the alternate current into a direct current, a voltage detector provided on the chip for detecting a voltage level of the direct current, and a controller provided on the chip and supplied with the detection signal from the voltage detector for controlling the oscillator such that the amplitude of the alternate current is changed in response to the detection signal. The controller increases the amplitude of the alternate current when the voltage level of the direct current has decreased below a predetermined level and decreases the amplitude of the alternate current when the voltage level of the direct current has increased above the predetermined level.

11 Claims, 12 Drawing Sheets

SMALL LOAD

LARGE LOAD

SMALL LOAD

LARGE LOAD

VOLTAGE GENERATOR FOR A SEMICONDUCTOR INTEGRATED CIRCUIT

BACKGROUND OF THE INVENTION

The present invention generally relates to semiconductor integrated circuits, and more particularly to a voltage generator circuit used in a semiconductor integrated circuit for producing a voltage that is different from a supply voltage supplied to the semiconductor integrated circuit.

In large scale integrated circuits, various d.c. voltages are used for substrate biasing, word line driving, and the like. For example, a negative voltage of $-3.5$ volts is used conventionally for the substrate biasing. For the word line driving, a positive voltage of $+7.5$ volts is used. These d.c. voltages are produced based upon a supply voltage that is supplied to the integrated circuit. In the conventional integrated circuit, a voltage of $+5$ volts has been used for the supply voltage.

In the recent semiconductor integrated circuits having an increased integration density, there is a tendency that the magnitude of the supply voltage is reduced in correspondence to the increased integration density. In correspondence to such a reduction in the supply voltage, the substrate bias voltage is reduced from $-3.5$ volts to about $-1$ volt for example. It will be noted that such a decrease in magnitude of the supply voltage and the bias voltage reduces the reverse bias voltage applied to the p-n junctions formed in the integrated circuit.

In the large scale integrated circuits, there is a tendency that the substrate bias voltage, provided by a voltage generator circuit, fluctuates in response to the state of operation of the semiconductor devices on the chip. For example, when a large number of transistors are activated simultaneously, a large substrate current flows and the magnitude of the substrate bias voltage is reduced correspondingly. This effect becomes particularly conspicuous when a bias generator having a large internal resistance is employed, as such bias generators generally have a limited output power for driving the load. When a circuit having a small internal resistance is used, on the other hand, there is a tendency that the power consumption is increased excessively. It should be noted that such a circuit consumes a large electric power even in the stand-by state.

In order to avoid the foregoing problem, there is proposed a voltage generator circuit for use in semiconductor integrated circuits wherein the operation of the voltage generator circuit is controlled adaptively in response to the substrate bias voltage. In these conventional voltage generator circuits, the supply voltage is converted once to an a.c. voltage, and a desired d.c. voltage is obtained by converting the a.c. voltage again to a d.c. voltage. The regulation of the output d.c. voltage is thereby achieved by turning on and turning off an a.c. voltage generator that is used in the voltage generator for producing the a.c. voltage.

FIG. 1 shows the circuit diagram of the conventional voltage generator disclosed in the Japanese Laid-open Patent Application 59-193056. Referring to FIG. 1, the circuit includes a ring oscillator 102 that is supplied with a d.c. supply voltage Vcc and produces an a.c. voltage in response thereto. The a.c. voltage thus produced is transferred to a charge pump 103 via an output buffer circuit 104, wherein the charge pump 103 produces the desired d.c. output voltage $V_{BB}$. The ring oscillator 102 is formed by connecting a number of CMOS inverters in series, while the charge pump 103 forms a voltage doubling rectifier including diodes D1 and D2 and a capacitor C.

In operation, the charge pump 103 produces an output voltage in proportion with the amplitude and the frequency of the output a.c. voltage of the ring oscillator 102 as the voltage $V_{BB}$, wherein the turning-on and turning-off of the ring oscillator 102 is achieved by a control circuit 101 that compares the output voltage $V_{BB}$ with a reference voltage $V_{REF}$. Thus, when the voltage $V_{BB}$ is decreased below the reference voltage $V_{REF}$ in response to the increase of the load, the control circuit 101 activates the ring oscillator 102 and the decrease in the voltage $V_{BB}$ is compensated. When the voltage $V_{BB}$ is increased above the reference voltage $V_{REF}$, on the other hand, the control circuit 101 disables the ring oscillator 102.

As will be easily understood from the foregoing operation, the conventional circuit of FIG. 1 has a problem of large voltage swing between the state in which the ring oscillator 102 is activated and the state in which the ring oscillator 102 is deactivated. Generally, such a voltage swing compensates the voltage fluctuation of $V_{BB}$ excessively and the problem of the stability of the bias voltage $V_{BB}$ is even deteriorated, particularly in the recent large scale integrated circuits that use the small supply voltage Vcc and the correspondingly small bias voltage $V_{BB}$. For example, the output voltage $V_{BB}$ of the conventional voltage generator circuit generally shows the voltage fluctuation of about 2.5 volts or more in response to the activation and deactivation of various semiconductor devices on the chip of the integrated circuit. Thus, in order to guarantee the minimum bias voltage of $-1.0$ volt, one has to set the nominal bias voltage $V_{BB}$ of the voltage generator circuit to a level of $-3.5$ volts or more. However, such a large bias voltage increases the reverse biasing applied to the p-n junction formed in the devices on the integrated circuit. In the recent large scale integrated circuits characterized by the high integration density, use of such a large bias voltage increases the risk of causing the breakdown of the devices on the integrated circuit.

FIG. 2 shows another conventional voltage generator circuit, wherein the circuit includes a first voltage generator unit B1 for producing the output voltage $V_{BB}$ with a large output power, and a second voltage generator unit B2 for producing the output voltage $V_{BB}$ with a small output power. The first voltage generator unit B1 consumes a large electric power while the second voltage generator unit B2 consumes little electric power. In the stationary state, the first voltage generator unit B1 is disabled for saving the electric power, and the control of the substrate biasing is achieved by the second voltage generator unit B2. Only when there is an increased load and associated drop of the bias voltage, which the second voltage generator B2 cannot compensate, the first voltage generator unit B1 is activated. For this purpose, a controller similar to the controller 101 is provided for detecting the variation of the bias voltage $V_{BB}$. Thus, the controller 101 activates the voltage generator unit B1 only when the bias voltage $V_{BB}$ has decreased below a reference voltage $V_{REF}$.

In this circuit, too, there is a problem, associated with the on/off control of the voltage generator unit B1, in that the voltage swing of the output voltage $V_{BB}$ between the state in which the voltage generator unit B1 is disabled and the state in which the voltage generator unit B1 is activated is excessively large. The circuit of FIG. 2 may be effective in the conventional integrated circuits that use the large substrate bias voltage such as −3.5 volts. In such an integrated circuit, the bias voltage may be allowed to change from −3.5 volts to about −1.5 volts. On the other hand, for the large scale integrated circuits that use the small bias voltage such as −1 volt, this circuit of FIG. 2 is totally inappropriate.

Further, there is a conventional voltage generator circuit as disclosed in the Japanese Laid-open Patent Applications 56-74956, 58-9352 and 60-80266, wherein a variable time constant circuit is provided in a ring oscillator such that the oscillation frequency of the ring oscillator is changed in correspondence to the substrate bias voltage $V_{BB}$.

FIG. 3 shows a circuit diagram of the conventional voltage generator circuit that falls in this type. Referring to FIG. 3, the voltage generator circuit includes a ring oscillator 102' in which a time constant circuit including a MOS transistor Q1 and a capacitor C1 and another time constant circuit including a MOS transistor Q2 and a capacitor C2 are connected in series.

In operation, the voltage $V_{BB}$ is detected by the gate of the MOS transistors Q1 and Q2, and the resistance of the MOS transistors and hence the time constant of the time constant circuit is changed in response to the voltage $V_{BB}$. When the bias current is small and the magnitude of the bias voltage $V_{BB}$ is large, the resistance is increased. On the other hand, when there is a large bias current and the magnitude of the bias voltage $V_{BB}$ is decreased, the resistance of the time constant circuit is decreased and the variation in the biasing voltage level is compensated.

In this conventional circuit, there arises a problem of increased power consumption caused as a result of the blunting of the oscillation waveform that in turn is caused by the time constant circuit. When there appears a blunting in the oscillation waveform, the CMOS inverter forming the ring oscillator is held at an intermediate state between the turned on state and the turned off state. In such an intermediate state, the P-channel MOS transistor and the N-channel MOS transistor connected in series and forming the CMOS inverter, are both turned on and a feed-through current flows through the CMOS inverter. Such a feed-through current flows even in the case where the ring oscillator is oscillating at a low frequency. Thereby, the power consumption of the voltage generator is inevitably increased.

SUMMARY OF THE INVENTION

Accordingly, it is a general object of the present invention to provide a novel and useful voltage generator circuit for semiconductor integrated circuits, wherein the foregoing problems are eliminated.

Another and more specific object of the present invention is to provide a voltage generator circuit for use in a semiconductor integrated circuit for producing a predetermined output voltage with a reduced voltage fluctuation.

Another object of the present invention is to provide a voltage generator circuit for a semiconductor integrated circuit that operates with a reduced power consumption.

Another object of the present invention is to provide a voltage generator circuit for a semiconductor integrated circuit having an analog feedback circuit for controlling the output voltage continuously such that the output voltage is held at a constant level.

Another object of the present invention is to provide a voltage generator circuit for a semiconductor integrated circuit for producing a substrate bias voltage with reduced magnitude, wherein the fluctuation of the substrate bias voltage is minimized.

Another object of the present invention is to provide a voltage generator circuit for a semiconductor integrated circuit comprising oscillation means for producing an a.c. voltage with a controlled frequency and amplitude, rectification means for rectifying the a.c. current for producing a d.c. current, voltage detection means for detecting a voltage level of the d.c. current for producing a control signal in response to the result of the detection, and feedback control means for controlling the oscillation means in response to said control signal such that the voltage level of the output d.c. current of the rectification means is held constant. According to the present invention, a desired d.c. voltage is obtained by the rectification of the a.c. voltage with a reduced fluctuation by controlling the frequency and amplitude of the a.c. current continuously in response the control signal. Particularly, one can hold the voltage level of the d.c. current precisely at a desired voltage level even when the magnitude of the desired voltage level is small. Thus, the present invention is suited for precise control of the substrate bias voltage of the semiconductor integrated circuit having a large integration density.

Other objects and further features of the present invention will become apparent from the following detailed description when read in conjunction with the attached drawings.

DETAILED DESCRIPTION

Figure 1:
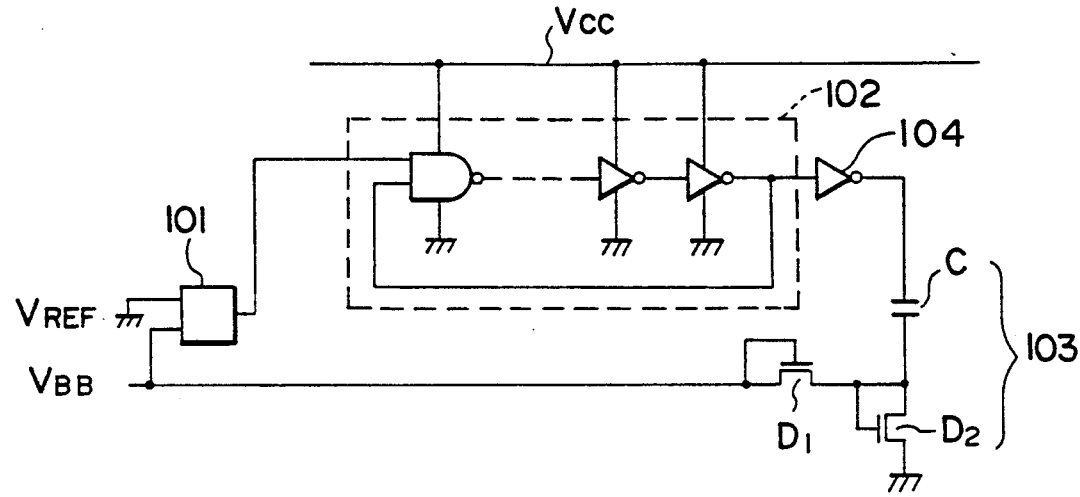
FIG. 1 is a circuit diagram showing a conventional voltage generator circuit used in semiconductor integrated circuits for producing a substrate bias voltage.
Figure 2:
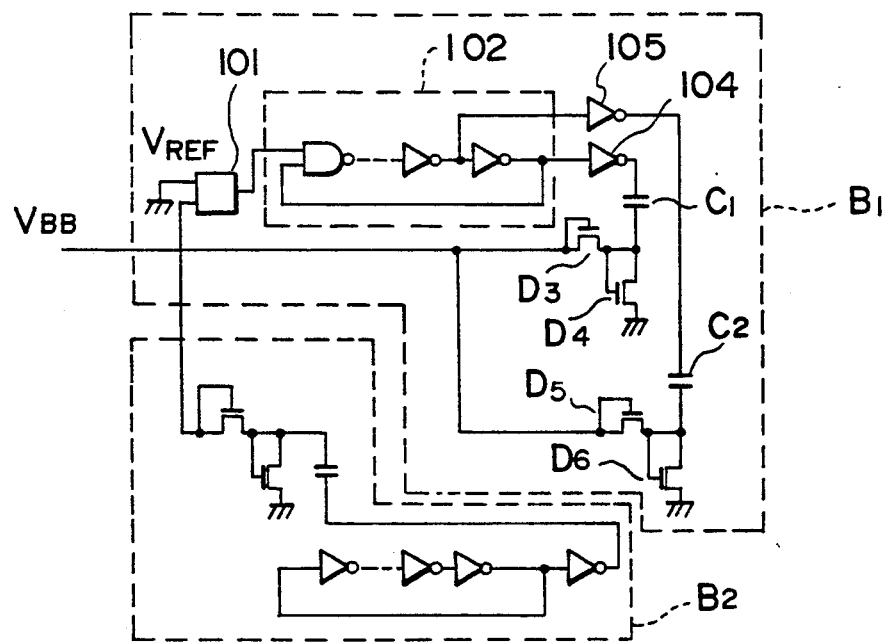
FIG. 2 is a circuit diagram showing another example of the conventional voltage generator circuit.
Figure 3:
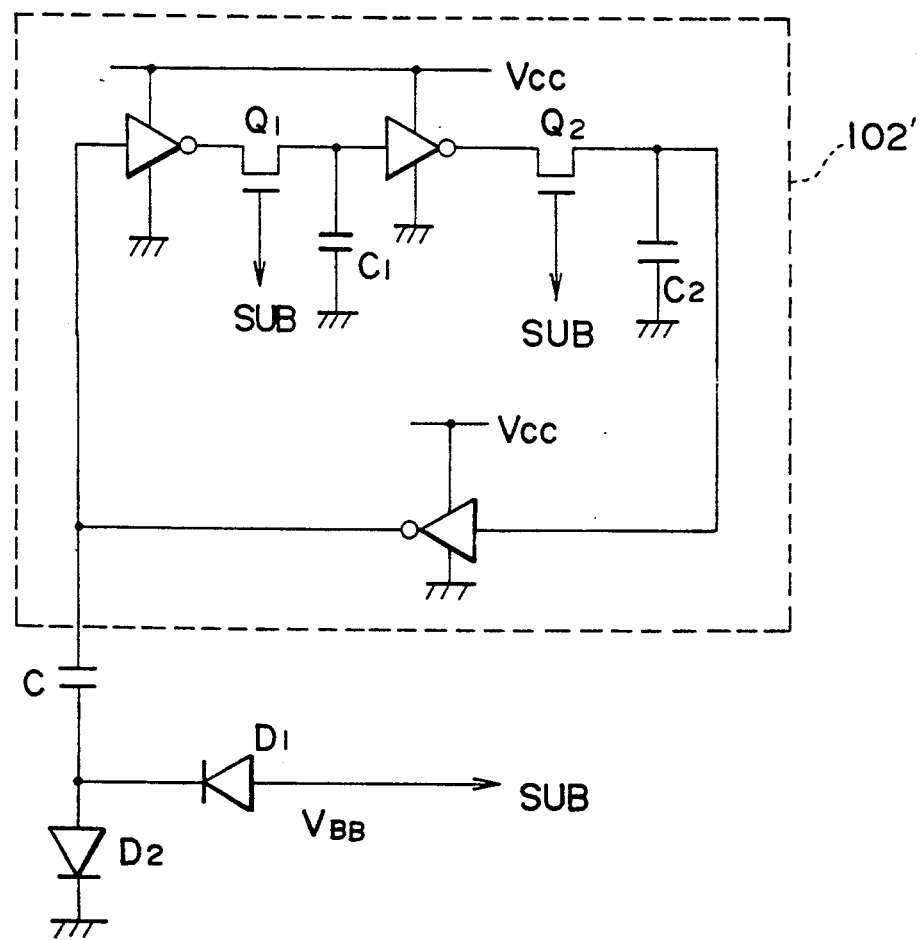
FIG. 3 is a circuit diagram showing still another example of the conventional voltage generator circuit.
Figure 4:
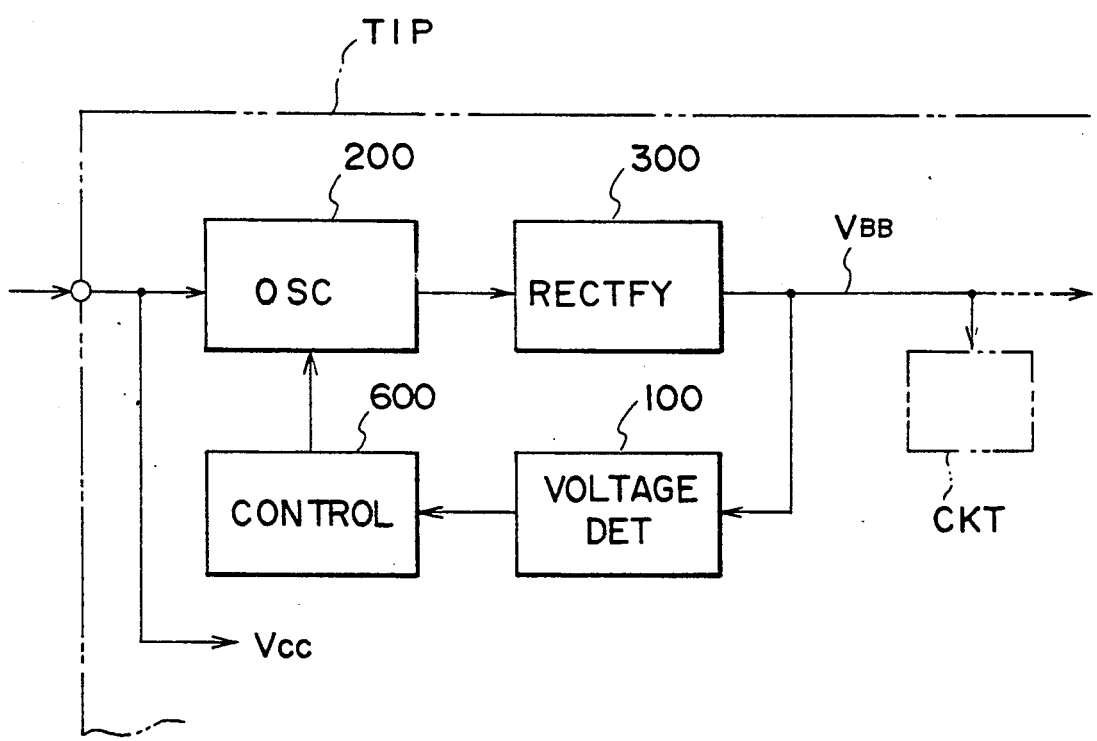
FIG. 4 is a block diagram showing the overall construction of the voltage generator circuit according to the present invention.

FIG. 4 shows the principle of the present invention.

Referring to FIG. 4, the voltage generator circuit of the present invention includes a ring oscillator 200 supplied with a supply voltage Vcc and produces an output a.c. voltage with a controlled frequency. The output a.c. voltage of the ring oscillator 200 is supplied to a charge pump circuit 300 that applies a rectification to the a.c. current and produces an output d.c. current with a voltage level of $V_{BB}$.

The d.c. current thus produced is supplied on the one hand to a chip on which semiconductor devices are integrated for biasing the substrate, and on the other hand to a voltage detector 100 that detects the level of the voltage $V_{BB}$. Based upon the detection, the voltage detector 100 produces a control signal for controlling a controller 600 that in turn controls the oscillation frequency of the ring oscillator 200. The circuits 100–600 may be provided on the same chip TIP on which the semiconductor devices generally represented as CKT are provided. Thereby, the biasing voltage $V_{BB}$ for the substrate biasing is held substantially constant.

Figure 5:
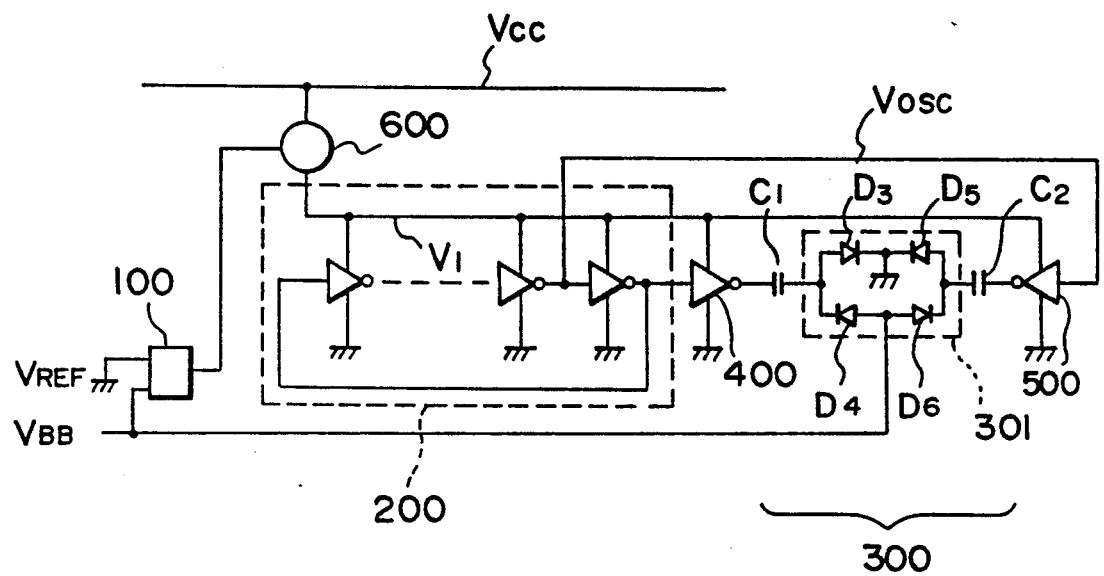
FIG. 5 is a circuit diagram showing a first embodiment of the present invention.

FIG. 5 shows a more detailed block diagram of the voltage generator circuit according to a first embodiment of the present invention.

Referring to FIG. 5, the circuit comprises the ring oscillator 200 that includes therein a number of inverters connected in series. The ring oscillator 200 operates in response to a supply voltage V1 that is produced by the supply voltage Vcc by the controller 600. As usual, the ring oscillator 200 oscillates with a frequency that is determined by the voltage V1, and thus, the a.c. voltage produced by the ring oscillator 200 has the frequency that is determined by the voltage V1.

The output of the ring oscillator 200 is supplied to the charge pump circuit 300 via a first output buffer circuit 400 and a cooperating capacitor C1 as well as via a second output buffer circuit 500 and a cooperating capacitor C2, wherein the charge pump circuit 300 includes a rectifier 301 that rectifies the output a.c. current of the ring oscillator 200 by diodes D3–D6 to produce the d.c. voltage with the voltage $V_{BB}$. It should be noted that the output buffer circuit 400 and the output buffer circuit 500 supply the output of the ring oscillator 200 with a mutually inverted phase relationship. The rectifier 301 has the construction of well known voltage doubler that doubles the voltage upon rectifying each half cycle of the a.c. voltage by charging and discharging the capacitors C1 and C2.

The output voltage $V_{BB}$ of the charge pump circuit 300 is then supplied to the voltage detector 100 that uses the ground level as a reference voltage $V_{REF}$ for detecting the voltage level $V_{BB}$. Based upon the detection of the voltage $V_{BB}$ and comparison with the reference voltage $V_{REF}$, the voltage detector 100 produces a control signal and supplies the same to the controller 600.

In response to the control signal, the controller 600 changes the voltage level V1 of the supply voltage that drives the ring oscillator 200, and the oscillation frequency of the ring oscillator 200 is changed in response to the voltage V1. When the oscillation frequency is changed, the voltage $V_{BB}$, which is obtained by the rectification in the charge pump circuit 300, is changed accordingly. For example, the voltage $V_{BB}$ decreases with decreasing oscillation frequency, while the voltage $V_{BB}$ increases with increasing oscillation frequency. Thus, the detector 100 and the controller 600 form an analog feedback loop for controlling the oscillation frequency of the ring oscillator 200 and hence the output voltage $V_{BB}$ of the voltage generator circuit.

Figure 6:
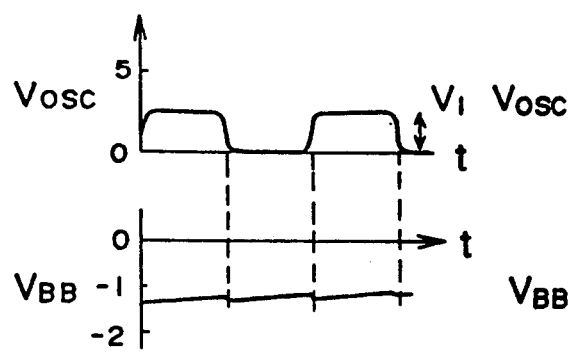
FIGS. 6(A) and 6(B) are diagrams respectively showing the operation of the circuit of FIG. 5 in the case where there is small substrate current and in the case where there is a large substrate current.
Figure 6:
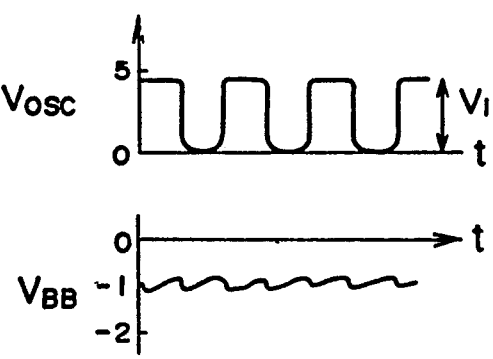

FIG. 6(A) shows the output of the voltage generator circuit of FIG. 5 for the case where the oscillation frequency of the ring-oscillator 200 is decreased, while FIG. 6(B) shows the output of the voltage generator circuit for the case where the oscillation frequency is increased. The analog feedback loop, formed of the voltage detector 100 and the controller 600, decreases the voltage V1 and hence the oscillation frequency when the magnitude of the voltage $V_{BB}$ is large in correspondence to the small substrate current flowing through the substrate as shown in FIG. 6(A). When there is a large voltage drop in the substrate bias voltage $V_{BB}$ in correspondence to a large substrate current, the oscillation frequency of the ring oscillator 200 is increased as shown in FIG. 6(B) and the voltage level $V_{BB}$ is maintained substantially the same.

Figure 7:
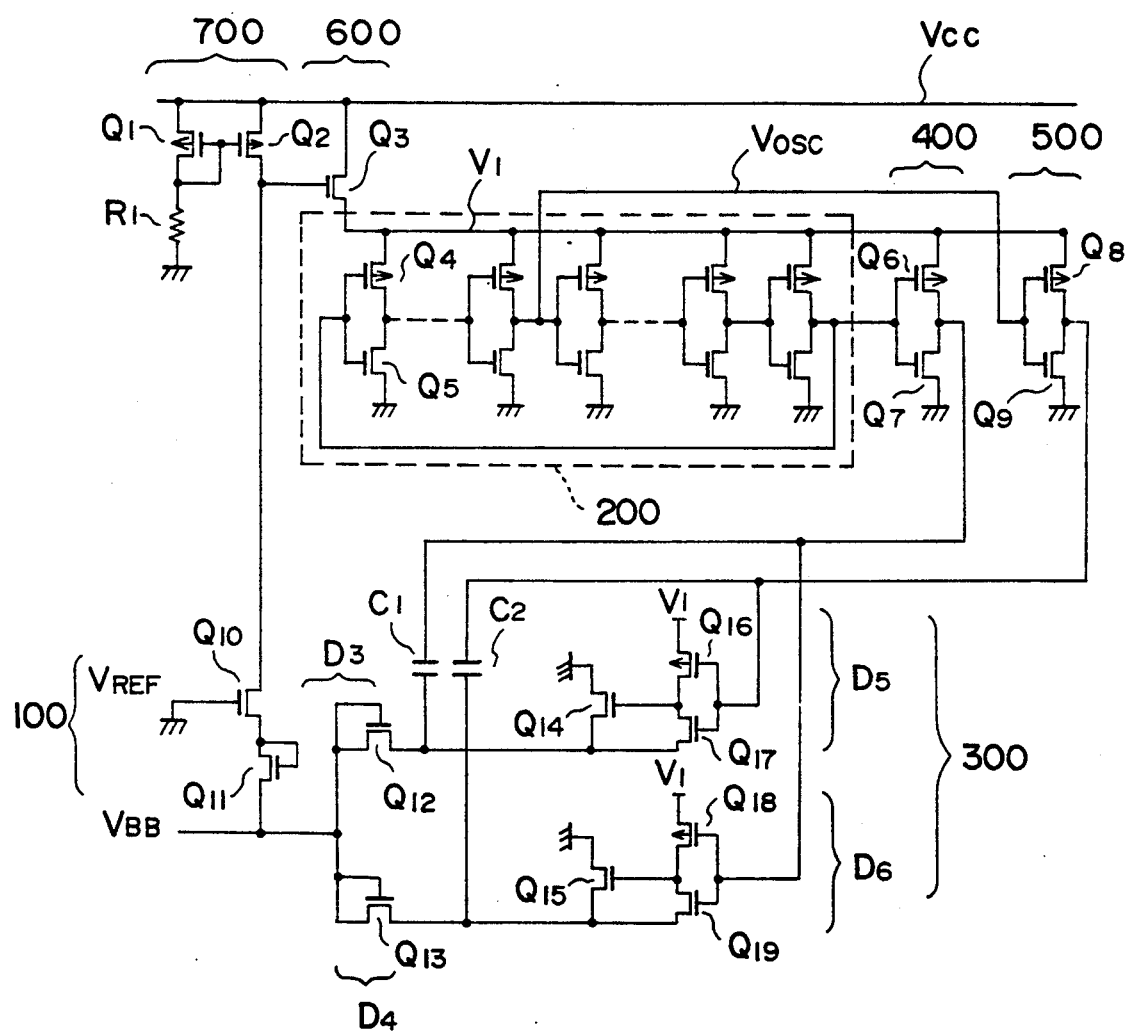
FIG. 7 is a circuit diagram showing a detailed circuit diagram of the circuit of FIG. 5 as a second embodiment of the present invention.

FIG. 7 is a circuit diagram showing a second embodiment of the present invention. It should be noted that the circuit of the present invention generally corresponds to the circuit of FIG. 5 except that the construction of each block is represented in detail.

Referring to FIG. 7, there is provided a current source circuit 700 that includes P-channel MOS transistors Q1 and Q2 connected to form a current mirror circuit together with a resistor R1. There, the transistor Q1 has a source connected to the supply voltage line Vcc and a drain connected to the ground via the resistor R1. Further, the gate of the transistor Q1 and the gate of the transistor Q2 are connected commonly, and the gate of the transistor Q1 is connected to the source of the same transistor Q1 as usual in the current mirror circuit. The MOS transistor Q2 has a source connected to the supply voltage line Vcc and acts as a load for producing a constant current output at a drain thereof.

In the circuit of FIG. 7, the controller 600 includes an N-channel MOS transistor Q3 that has a drain connected to the supply voltage line Vcc and a gate connected to the source of the MOS transistor Q2. Thereby, the transistor Q3 produces the voltage V1 at a source thereof in response to the voltage appearing at the drain of the MOS transistor Q2.

The drain of the transistor Q2 of the current source circuit 700 is further connected to the drain of an N-channel MOS transistor Q10 that has a gate connected to the ground for receiving the reference voltage $V_{REF}$. The transistor Q10 is connected in series to another N-channel MOS transistor Q11 that has a gate and a drain connected with each other. The source of the transistor Q11 is connected to a line on which the output voltage $V_{BB}$ is supplied. There, the transistor Q11 acts as a load while the transistor Q10 controls the current flowing therethrough in response to the voltage $V_{BB}$, based upon the comparison of the voltage $V_{BB}$ with the ground voltage level. Thus, it will be understood that the transistors Q10 and Q11 form the aforementioned voltage detector 100. The control signal produced by the voltage detector 100 is thereby supplied to the transistor Q3 forming the controller 600 in the form of a control current.

In response to the control current, the voltage level at the drain of the transistor Q2 and hence the voltage level at the gate of the transistor Q3 are changed, and the transistor Q3 changes the voltage V1 is response thereto.

As usual, the ring oscillator 200 includes a number of inverters cascaded with each other, wherein each inverter is formed from a P-channel MOS transistor Q4 and an N-channel MOS transistor Q5 that are connected in series. The supply voltage V1 outputted from the controller 600 is supplied to the source of the P-channel MOS transistors Q4, and the ring oscillator changes its oscillation frequency in response to the supply voltage V1. The ring oscillator 200 supplies a first output having a first phase to the inverter 400 that includes therein a P-channel MOS transistor Q6 and an N-channel MOS transistor Q7 connected in series as usual. Further, the ring oscillator 200 supplies a second output having a second, inverted phase to the inverter 500 that includes a P-channel MOS transistor Q8 and an N-channel MOS transistor Q9 connected in series.

The output of the inverter 400 is supplied to the charge pump circuit 300 via the capacitor C1. Similarly, the output of the inverter 500 is supplied to the circuit 300 via the capacitor C2. In the circuit 300, the diode D3 is provided by an N-channel MOS transistor Q12 having a source and a gate connected with each other, while the diode D4 is provided by an N-channel MOS transistor Q13 that has a source and a gate connected with each other, wherein the first output of the ring oscillator 200 is supplied to the drain of the transistor Q12 via the capacitor C1 and the second output of the ring oscillator 200 is supplied to the drain of the transistor Q13 via the capacitor C2.

The diode D5 is provided by an N-channel MOS transistor Q14 having a source connected to the drain of the transistor Q12 for receiving the output of the inverter 400 via the capacitor C1 and a drain connected to the ground. Further, in order to control the conduction of the transistor Q14, a P-channel MOS transistor Q16 and an N-channel MOS transistor Q17 are provided in series to form an inverter. There, respective gates of the transistors Q16 and Q17 are connected commonly with each other to receive the second output of the ring oscillator 200 directly from the inverter 500. Thereby, the P-channel MOS transistor Q16 has a source to which the voltage V1 is supplied from the controller 600, while the transistor Q17 has a source that is connected commonly with the source of the transistor Q14 to the drain of the transistor Q12 for receiving the output of the inverter 400 via the capacitor C1. The transistors Q16 and Q17 control the turning on and turning off of the transistor Q14 in response to the polarity of the output a.c. current of the inverter 500 and the transistor Q14 acts as a diode.

Similarly, the diode D6 is provided by an N-channel MOS transistor Q15 that has a source connected to the drain of the transistor Q13 for receiving the output of the inverter 500 via the capacitor C2 and a drain connected to the ground. In order to control the conduction of the transistor Q16, a P-channel MOS transistor Q18 and an n-channel MOS transistor Q19 are provided in series connection to form an inverter. Again, respective gates of the transistors Q16 and Q17 are connected commonly with each other to receive the second output of the ring oscillator 200 directly from the inverter 400. The transistor Q18 has a source to which the voltage V1 is supplied from the controller 600 while the transistor Q19 has a source that is connected commonly with the source of the transistor Q15 to the drain of the transistor Q13 for receiving the output of the inverter 500 via the capacitor C2. Thereby, the transistors Q18 and Q19 control the turning on and turning off of the transistor Q15 in response to the polarity of the a.c. current obtained from the inverter 400 such that the transistor Q15 behaves as a diode.

By constructing the diode D5 and D6 from the transistors Q14 - Q19, one can eliminate the forward threshold that is pertinent to the usual diode. Thereby, an efficient rectification becomes possible without experiencing the voltage drop caused by the threshold voltage of the diode. The diodes D3–D6 form a rectifier circuit substantially identical with the rectifier 301 of FIG. 5 and supplies the output voltage $V_{BB}$ to the source of the transistor Q11 forming the detector 100.

Next, the operation of the voltage generator circuit of FIG. 7 will be described in detail.

Considering a case where the substrate current is increased in response to the activation of various semiconductor devices provided on the chip, the magnitude of the output voltage $V_{BB}$ of the voltage generator circuit is decreased. For example, the output voltage $V_{BB}$ that assumes the value of $-1.5$ volts in the normal state, changes to $-1.2$ volt. In response to this, the transistor Q10 having the threshold voltage of 0.8 volts and the gate connected to the ground, causes a transition to increase the internal resistance. It should be noted that the transistor Q11 has the threshold voltage of 0.7 volts and there is a voltage drop of 0.7 volts across the source and drain of the transistor Q11.

In response to the transition of the transistor Q10, the voltage level at the drain of the transistor Q2, forming a part of the current-mirror circuit and supplying a constant current, is increased generally proportional to the voltage $V_{BB}$. This in turn causes a corresponding increase in the gate voltage of the transistor Q3, and the voltage level V1 at the source of the transistor Q3 is increased. In response to the increase in the voltage V1, the oscillation frequency of the ring oscillator 200 is increased. Further, such an increase in the voltage V1 causes an increase in the amplitude of the output a.c. voltage.

In response to the increase in the frequency and the amplitude of the output a.c. voltage, the output voltage $V_{BB}$ produced by the charge pump circuit 300 increases. In other words, the drop of the voltage $V_{BB}$ is compensated by the feedback operation that is achieved by the voltage detector 100 and the controller 600, and the voltage $V_{BB}$ returns to the original voltage of $-1.5$ volts. It should be noted that this voltage of $-1.5$ volts for the stationary state is determined as a sum of the threshold voltage of the transistors Q10 and Q11. In the present example, the transistor Q10 has the threshold voltage of 0.8 volts while the transistor Q11 has the threshold voltage of 0.7 volts as already noted. When one wishes to have a larger stationary voltage for the voltage $V_{BB}$, extra number of the transistors may be connected in series to the transistors Q10 and Q11.

When the magnitude of the voltage $V_{BB}$ has increased excessively, on the other hand, the internal resistance of the transistor Q10 decreases. Thereby, the voltage level at the drain of the transistor Q10 and hence the voltage level at the gate of the transistor Q3 is decreased and the voltage V1 is decreased accordingly. In response thereto, the frequency and the amplitude of the a.c. current produced by the ring oscillator 200 are decreased and the voltage rise is compensated.

Figures 8A, 8B:
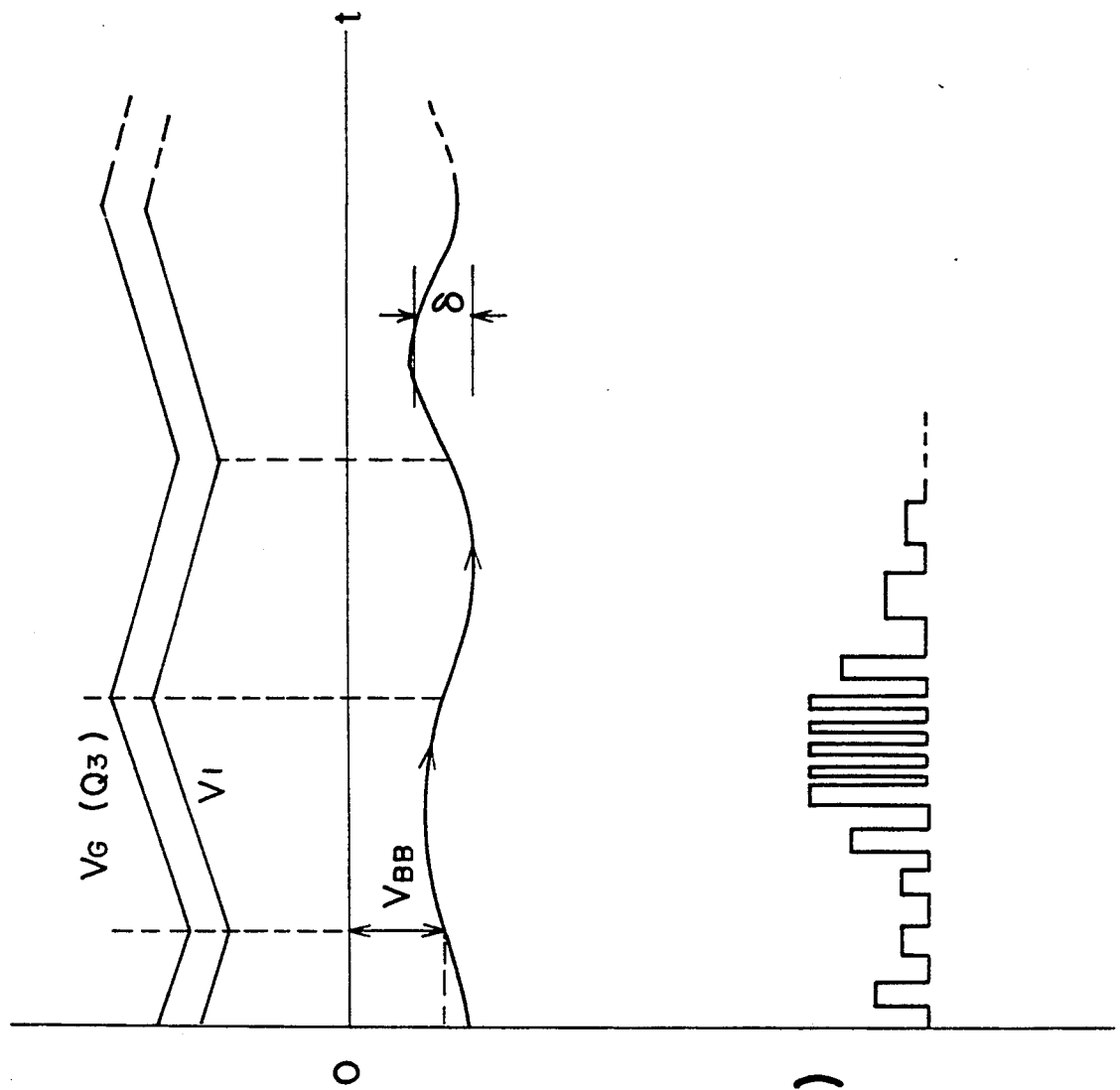
FIGS. 8(A) and 8(B) are diagrams showing the operation of the circuit of FIG. 7.

FIG. 8(A) shows the time-dependent variation of the gate voltage VG of the transistor Q3 and the voltage V1 that is obtained at the source of the transistor Q3. Further, FIG. 8(B) shows the waveform of the a.c. current outputted from the ring oscillator 200. As can be seen in FIG. 8(B), the amplitude and the frequency of the output a.c. current increases with increasing gate voltage $V_G$ and the voltage V1 when the magnitude of the voltage $V_{BB}$ is decreased. When the magnitude of the voltage $V_{BB}$ is increased, on the other hand, the voltage $V_G$ and the voltage V1 decrease and the amplitude as well as the frequency of the ring oscillator 200 are decreased. Thereby, the fluctuation of the voltage level $V_{BB}$ is held within a range $\delta$ that is typically less than 0.1 volts. In other words, the voltage generator of FIG. 7 can provide the stabilized output voltage $V_{BB}$ at $-1.5 \pm 0.1$ volts. Thus, the voltage generator circuit of the present invention is suitable for use in recent large scale integrated circuits that require reduced substrate biasing due to the submicron patterning.

Next, a third embodiment of the present invention will be described with reference to FIG. 9.

Figure 9:
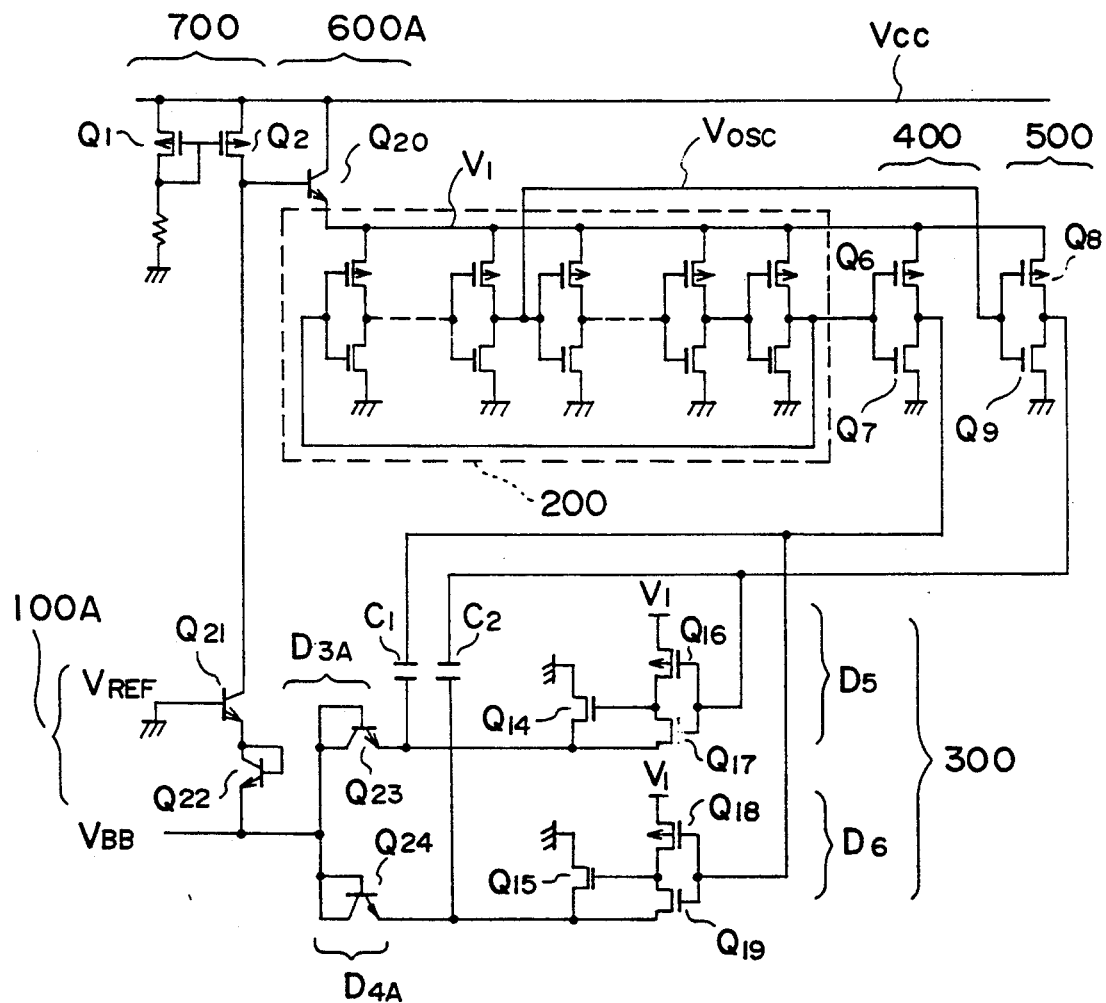
FIG. 9 is a circuit diagram showing a third embodiment of the present invention.

Referring to FIG. 9, the basic circuit construction is identical with the circuit of FIG. 5 except that the diode D3 and the diode D4 are replaced by bipolar transistors Q23 and Q24 respectively, wherein the diode Q23 has a base and a collector connected with each other to form a diode D3A, and the diode Q24 has a base and a collector connected with each other to form a diode D4A. Further, the MOS transistors Q10 and Q11 are replaced by bipolar transistors Q21 and Q22, wherein the transistor Q21 has a base connected to the ground and turned on and off in response to the voltage $V_{BB}$ On the other hand, the transistor Q22 has its base and collector connected to form a load similar to the transistor Q11. Thereby, the bipolar transistors Q21 and Q22 form a voltage detector 100A that replaces the voltage detector 100.

Further, in response to the bipolar construction of the voltage detector 100A, the controller 600 is replaced by a controller 600A that includes a bipolar transistor Q20 having a base connected to the drain of the MOS transistor Q2 and a collector connected to the supply voltage line Vcc. The drive voltage V1 is obtained at an emitter of the transistor Q20.

The circuit of FIG. 9 operates substantially identical with the circuit of FIG. 7. The circuit is preferable in the point that it provides a larger output power for the substrate biasing.

Figure 10:
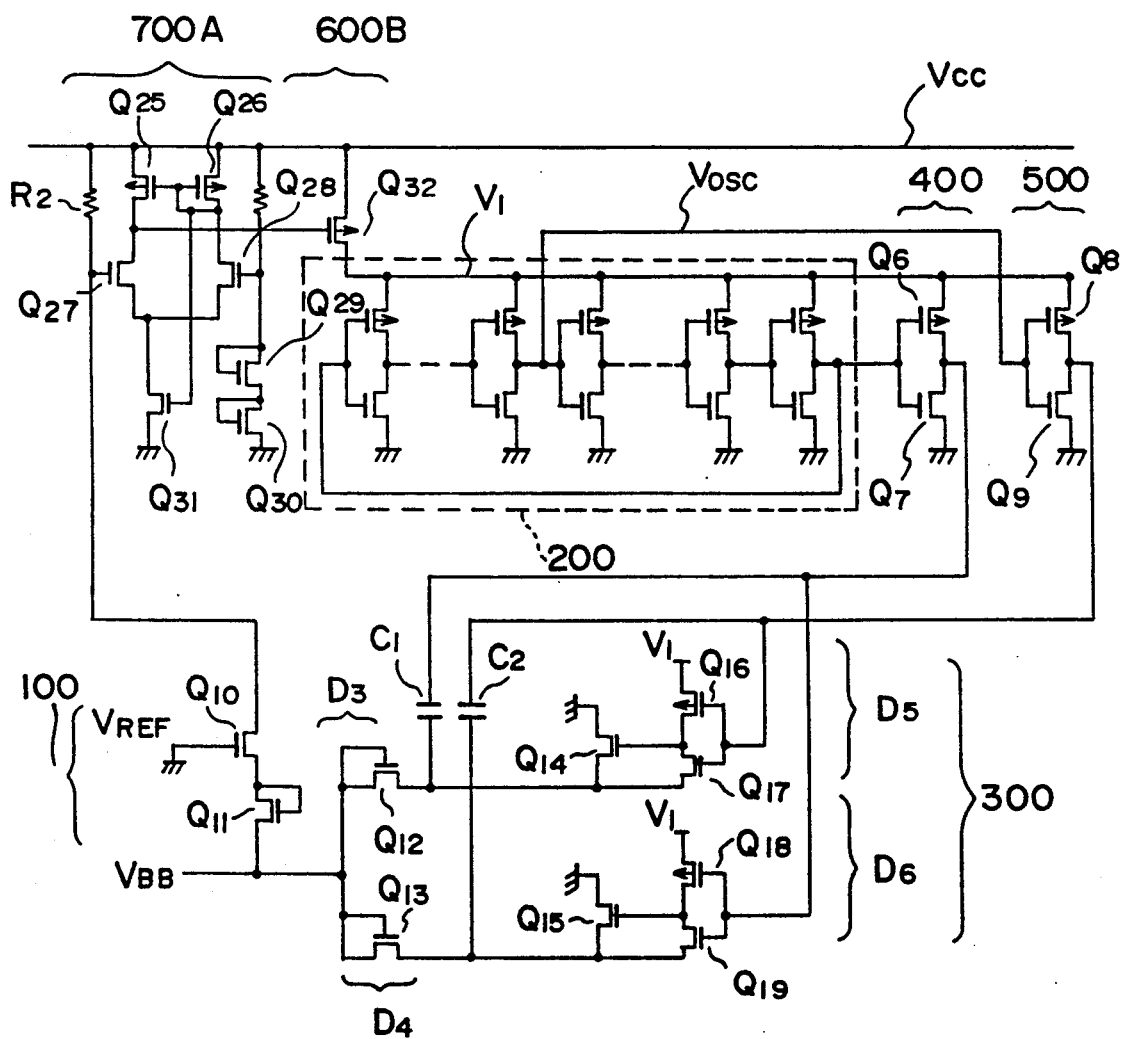
FIG. 10 is a circuit diagram showing a fourth embodiment of the present invention.

FIG. 10 shows a fourth embodiment of the present invention.

Referring to FIG. 10, this embodiment has a construction similar to the circuit of FIG. 7 except that a current source circuit 700A is used in place of the current source circuit 700. The current source circuit 700A includes P-channel MOS transistors Q25 and Q26 and N-channel MOS transistors Q27, Q28 and Q31 that form a differential amplifier. Thus, the circuit 700A will be referred to as differential amplifier. Further, a controller 600B including a P-channel MOS transistor Q32 is used in place of the controller 600 of FIG. 7. The use of the P-channel MOS transistor for the controller 600B for producing the voltage V1 forms an essential feature of the present embodiment.

The differential amplifier 700A is supplied on the one hand with the output of the voltage detector 100 and on the other hand with a reference voltage, and produces an output in accordance with the difference between the output of the circuit 100 and the reference voltage. For this purpose, there is provided a reference voltage generator that includes N-channel MOS transistors Q29 and Q30 connected in series between the voltage supply line Vcc and the ground via a resistor. Each of the transistors Q29 and Q30 has its gate and drain connected with each other and induces a voltage drop corresponding to the threshold voltage of the transistor across the source and the drain. Thereby, the reference voltage generator produces a predetermined reference voltage corresponding to the sum of the threshold voltages of the transistor Q29 and the transistor Q30, and supplies the same to the gate of the MOS transistor Q28 forming a part of the differential amplifier 700A.

The output of the voltage detector 100 in turn is supplied to the gate of the MOS transistor Q27 as another input to the differential amplifier 700A. In response to the input voltages to the respective gates of the transistors Q27 and Q28, the circuit 700A produces an output at the drain of the MOS transistor Q27 in proportion with the voltage difference therebetween, and supplies the same to the gate of the transistor Q32 that forms the controller 600B. Thus, the voltage V1 is controlled in response to the voltage $V_{BB}$ that is detected by the voltage detector 100 via the differential amplifier 700A and the controller 600B.

In more detail, when the voltage level of the output voltage $V_{BB}$ is decreased below the predetermined level such as $-1.5$ volts, the transistor Q10 is turned off as already described with reference to FIG. 7. In response to this, the drain voltage of the transistor Q10 increases, and the gate voltage of the transistor Q27 increases accordingly. When the voltage level at the gate of the transistor Q27 has increased above the gate voltage of the transistor Q28, the internal resistance of the transistor Q27 decreases lower than the internal resistance of the transistor Q28. As a result, the drain voltage of the transistor Q27 and hence the gate voltage of the transistor Q32 decreases. On the other hand, the drain voltage of the transistor Q28 increases slightly and the internal resistance of the transistor Q31 decreases correspondingly. Thereby, the drain voltage of the transistor Q27 decreases further.

As a result of the foregoing operation, the internal resistance of the transistor Q32 is decreased. In correspondence thereto, the voltage V1 increases to the level of the supply voltage Vcc. It should be noted that the circuit of FIG. 7 described previously cannot set the highest voltage of the voltage V1 equal to the supply voltage Vcc because of the voltage drop of Vth caused across the source and the drain of the N-channel transistor Q3. This voltage Vth of course represents the threshold voltage of the transistor Q3. In the present embodiment, on the other hand, one can set the maximum voltage V1 equal to the supply voltage Vcc by controlling the P-channel MOS transistor Q32 by the output of the differential amplifier 700A. Thereby, the voltage generator of the present embodiment can deal with a larger load variation that causes a larger fluctuation of the voltage $V_{BB}$.

In the case when the magnitude of the output voltage $V_{BB}$ has increased excessively beyond the level of $-1.5$ volts, on the other hand, the drain voltage of the transistor Q10 decreases. In response thereto, the drain voltage of the transistor Q27 increases. As a result, the internal resistance of the transistor Q32 increases and the voltage V1 is decreased. Thus, the voltage generator of the present embodiment is effective for stabilizing the substrate bias voltage in the semiconductor integrated circuits.

Figure 11:
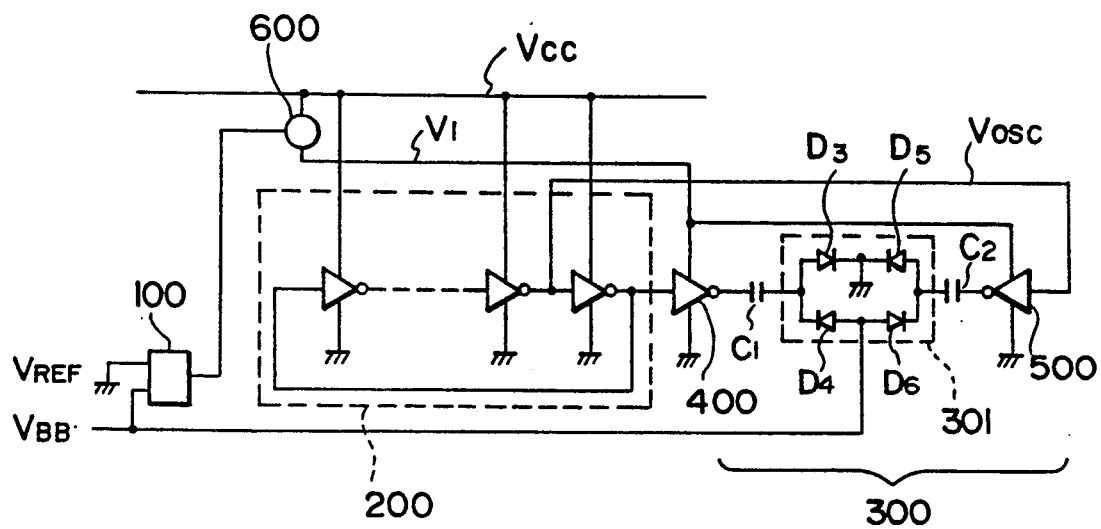
FIG. 11 is a circuit diagram showing a fourth embodiment of the present invention.

FIG. 11 shows a fifth embodiment of the present invention.

Referring to FIG. 11, the voltage generator circuit of the present embodiment includes the ring oscillator 200, the buffer circuits 400 and 500, the charge pump circuit 300, the voltage detector 100 and the controller 600 similar to the embodiment of FIG. 5, except that ring oscillator 200 is driven by the supply voltage Vcc rather than by the voltage V1. Thereby, the ring oscillator 200 oscillates at a constant frequency determined by the supply voltage Vcc.

In order to compensate the variation in the output voltage $V_{BB}$, the present embodiment employs a construction that the controller 600 supplies the voltage V1 not to the ring oscillator 200 but to the buffer circuits 400 and 500 as the drive voltage. In response to the voltage V1, the buffer circuits 400 and 500 modify the amplitude of the output a.c. current of the ring oscillator 200 and hence the output voltage $V_{BB}$ of the voltage generator circuit. This change of the voltage $V_{BB}$ is detected by the voltage detector 100 and the controller 600 controls the voltage V1 in response to the voltage detection in the detector 100 similarly to previous embodiments. Thereby, a feedback control for maintaining the voltage level $V_{BB}$ constant is achieved.

Figure 12:
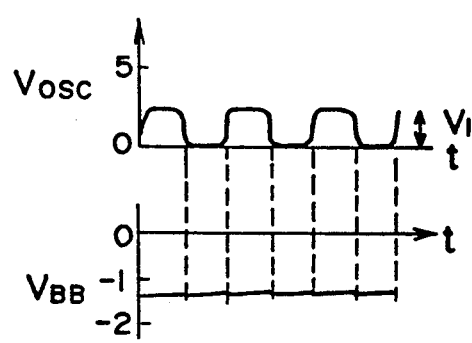
FIGS. 12(A) and 12(B) are diagrams showing the operation of the circuit of FIG. 11.
Figure 12:
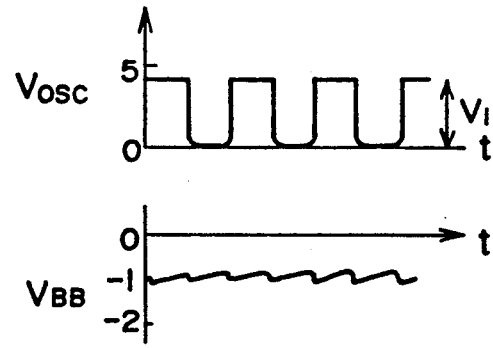

FIGS. 12(A) and 12(B) show the oscillation waveform of the output a.c. voltage produced by the ring oscillator 200 of FIG. 11. As can be seen in these drawings, the amplitude of the output a.c. voltage is changed in response to the drive voltage V1 while the frequency of the a.c. current remains unchanged. Thus, when there is little substrate bias current as shown in FIG. 12(A), the voltage level V1 is set small and the output voltage $V_{BB}$, obtained by the rectification of the output a.c. current in the charge pump circuit 300, is set at the predetermined voltage level such as −1.5 volts. On the other hand, when the substrate bias current is increased in response to the activation of devices on the chip and the magnitude of the voltage level $V_{BB}$ decreased correspondingly as shown in FIG. 12(B), the output amplitude of the a.c. current is increased as shown in FIG. 12(B). By rectifying the output a.c. current by the charge pump circuit 300, one can compensate the voltage drop of $V_{BB}$ as already described.

Figure 13:
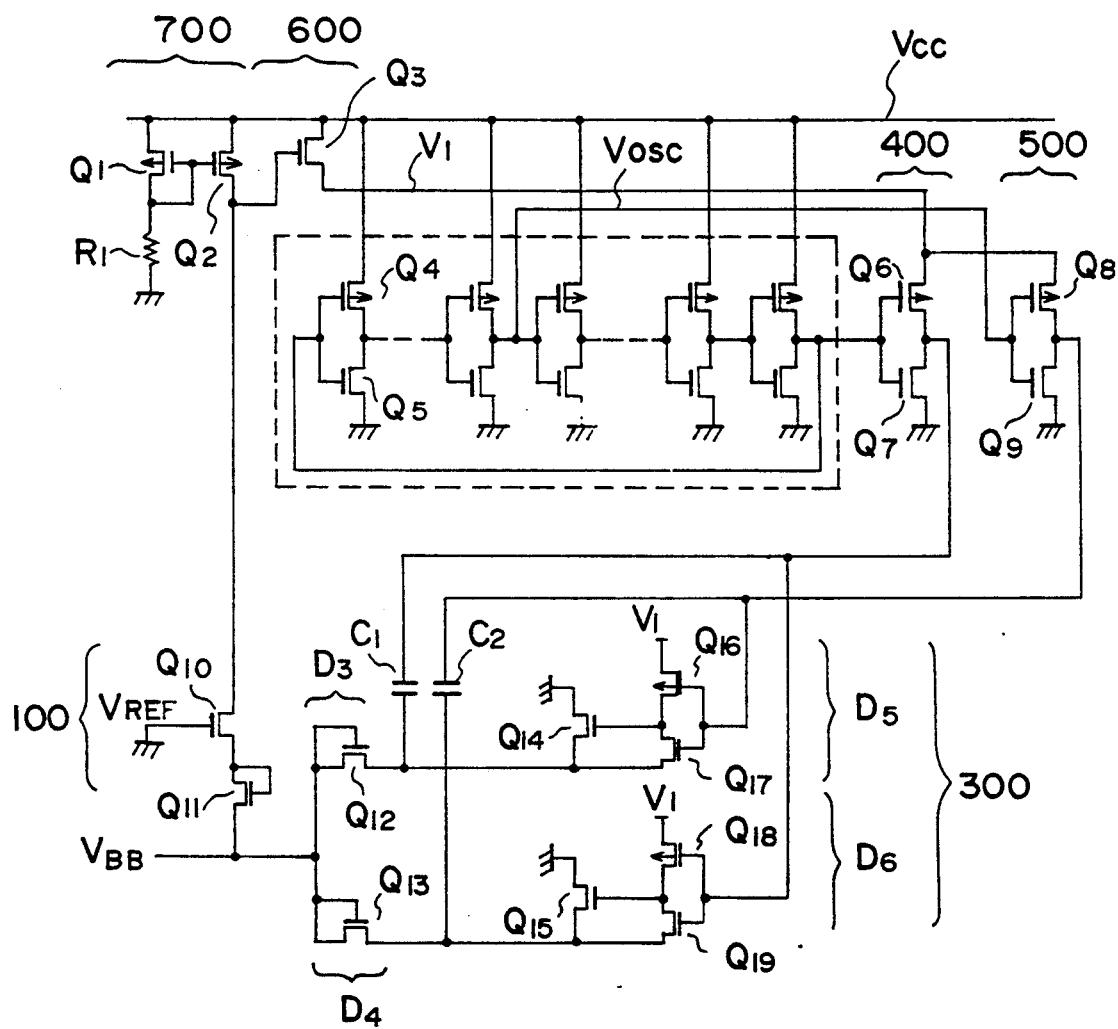
FIG. 13 is a detailed circuit diagram of the circuit of FIG. 11.

FIG. 13 shows a more detailed circuit diagram of the circuit of FIG. 11 as a sixth embodiment of the present invention. In FIG. 13, the parts that correspond to those parts described previously with reference to preceding drawings are designated by the same reference numerals and the description will be omitted.

In this circuit, the output voltage V1 obtained at the source of the MOS transistor Q3 of the controller 600 is supplied to the source of the P-channel MOS transistor Q6 forming the first output buffer circuit 400 and further to the source of the P-channel MOS transistor Q8 forming the second output buffer circuit 500. In correspondence to this, each inverters in the ring oscillator 200 is connected to the supply voltage line Vcc. Thereby, the ring oscillator 200 oscillates at the frequency determined by the voltage Vcc, while the amplitude of the output a.c. current of the ring oscillator 200 is changed in response to the voltage V1. Other operational feature of the present embodiment is identical with the circuit of FIG. 7 and further description will be omitted.

Figure 14:
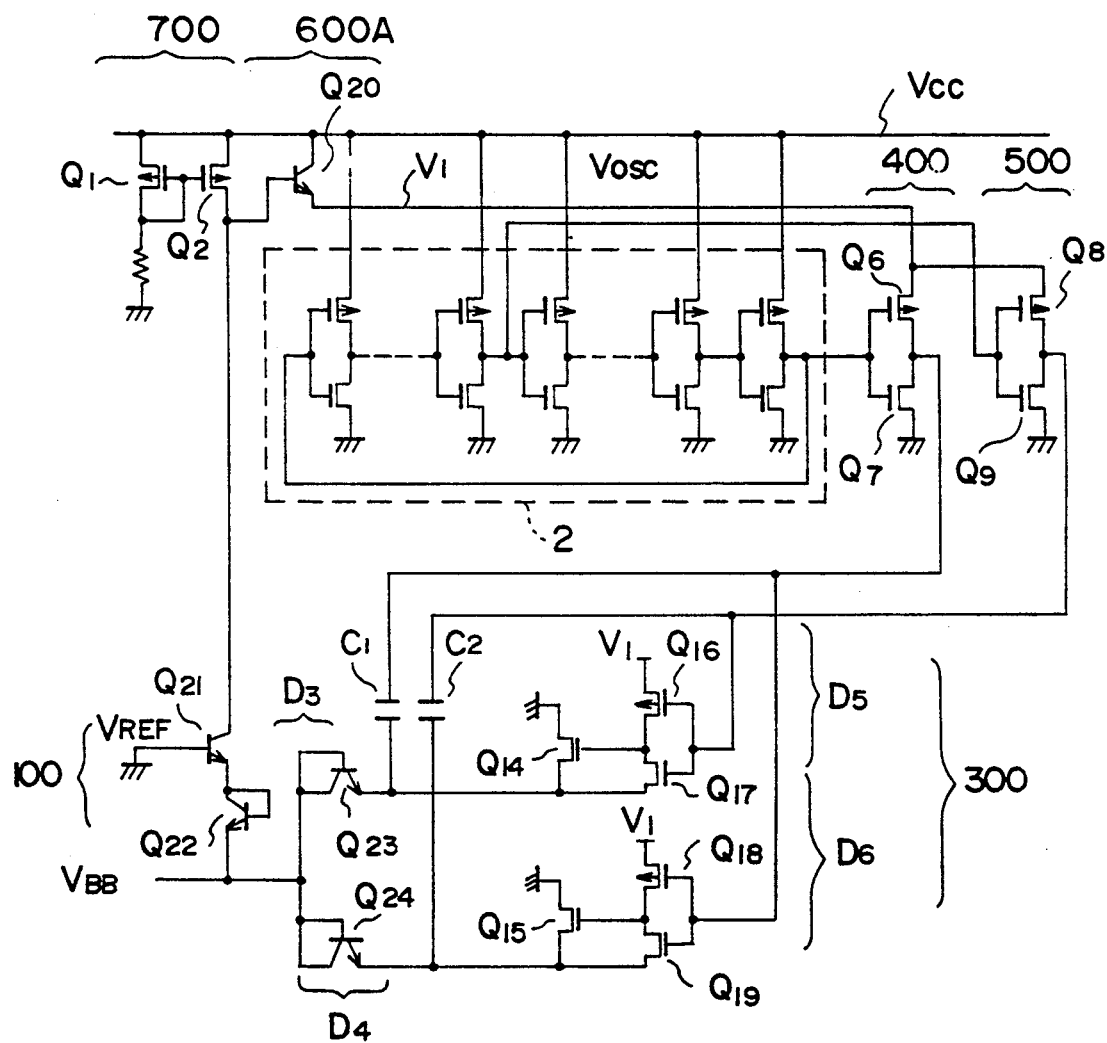
FIG. 14 is a circuit diagram showing a fifth embodiment of the present invention.

FIG. 14 shows a seventh embodiment of the present invention. In the present embodiment, the MOS transistors Q12 and Q13 forming the diodes D3 and D4 are replaced with bipolar transistors Q23 and Q24 similar to the circuit of FIG. 9. Further, the MOS transistors Q10 and Q11 of the voltage detector 100 are replaced by bipolar transistors Q21 and Q22 forming the alternative voltage detector 100A, and the MOS transistor Q3 forming the controller 600 is replaced by the bipolar transistor Q20 that forms the alternative controller 600A. Similar to the previous embodiment of FIG. 13, each inverter in the ring oscillator 200 is driven by the supply voltage Vcc, while the first and second output buffer circuits are driven by the voltage V1 produced by the controller 600A. As the operational feature of the present embodiment is substantially the same as the circuit of FIG. 13, further description will be omitted.

Figure 15:
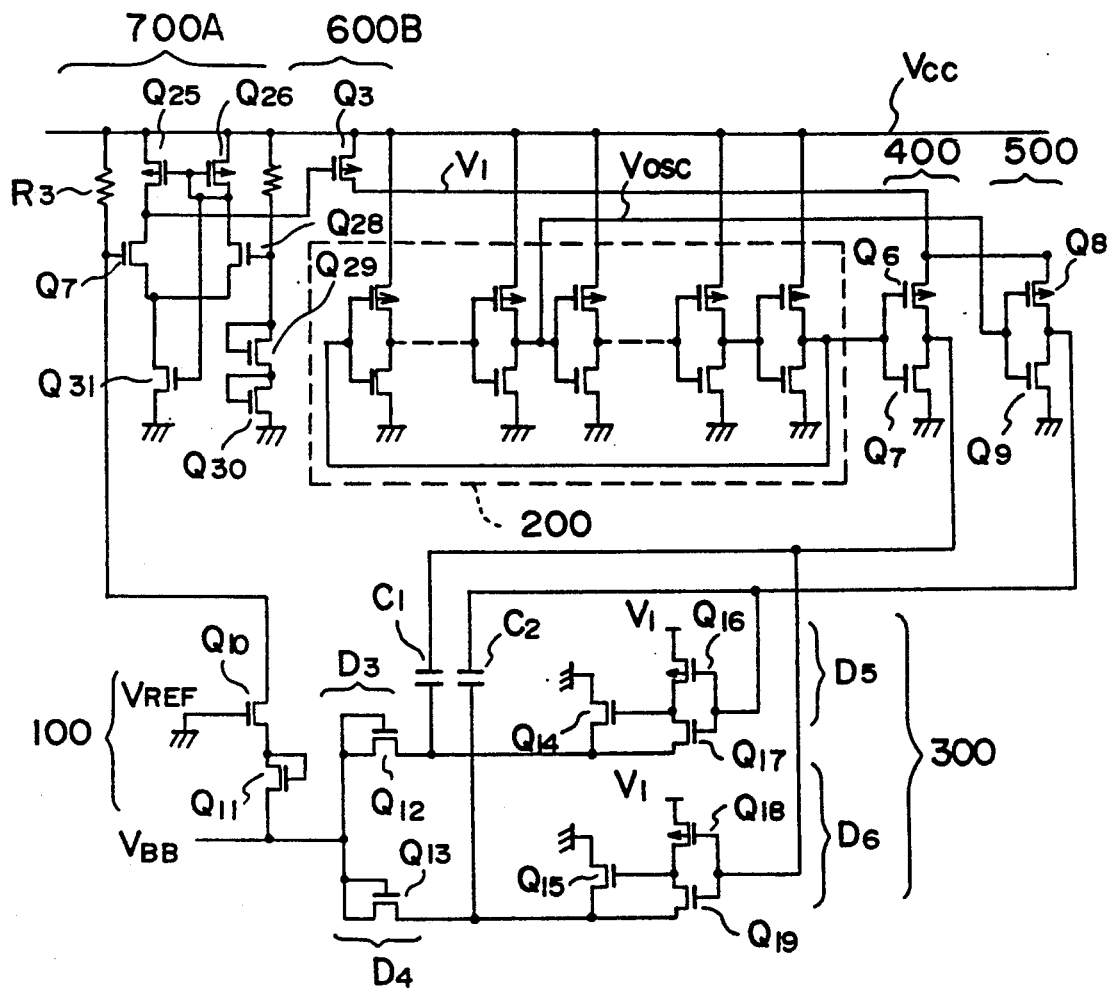
FIG. 15 is a circuit diagram showing a sixth embodiment of the present invention.

FIG. 15 shows an eighth embodiment of the present invention. In this embodiment, the differential amplifier 700A and the controller 600B including the P-channel MOS transistor Q3 are used for the current source circuit 700 and the controller 600, similar to the embodiment of FIG. 10. The rest of the construction is identical with the circuit of FIG. 13. This circuit operates also as shown in FIGS. 12(A) and 12(B), and has the preferable feature that is pertinent to the circuit of FIG. 10.

Figure 16:
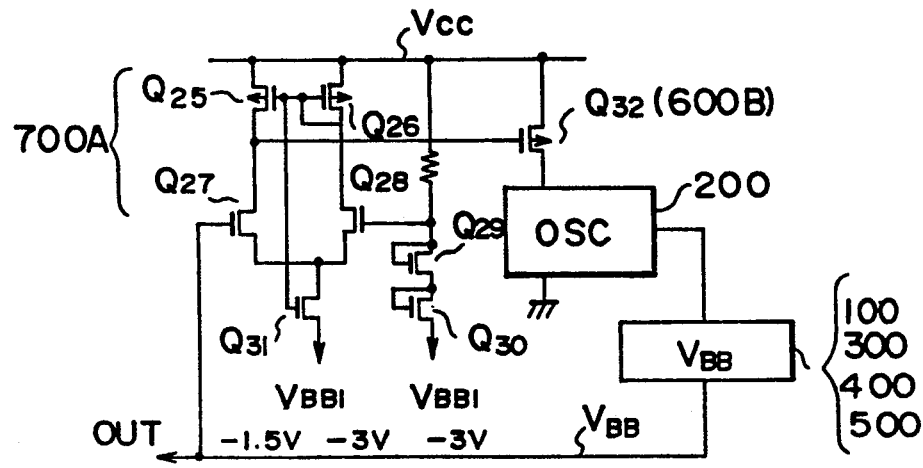
FIG. 16 is a circuit diagram showing a seventh embodiment of the present invention.

FIG. 16 shows a ninth embodiment of the present invention.

Referring to FIG. 9, the circuit of the present invention is generally identical with the circuit of FIG. 10 except that the source of the transistor Q31 and the source of the transistor Q30 are connected not to the ground but to another constant power supply that provides a voltage of $V_{BB1}$. For example, the voltage $V_{BB1}$ may be set to −3 volts. By providing a large negative voltage to the source of the transistors Q30 and Q31, one can change the voltage V1 produced by the transistor Q32 in the range that is larger than the case of FIG. 10. In the circuit of FIG. 10, it should be noted that the voltage V1 can be changed only in the range between Vcc and Vth that is the threshold voltage of the transistor Q10. In the present embodiment, the voltage V1 can be changed between Vcc and a lower limit voltage that is lower than Vth.

Further, the present invention is not limited to the embodiments described heretofore, but various variations and modifications may be made without departing from the scope of the invention.

What is claimed is:

1. A semiconductor integrated circuit, comprising:
   a plurality of semiconductor devices;
   a chip for supporting said semiconductor devices;
   oscillation means provided on said chip, said oscillation means being supplied with a drive voltage and producing an alternating current with a controlled amplitude that is determined by said drive voltage;
   rectification means provided on said chip for receiving and converting said alternating current into a direct current, said rectification means supplying said direct current to said semiconductor devices on said chip;
   voltage detection means provided on said chip and supplied with said direct current from said rectification means for detecting a voltage level of said direct current, said voltage detecting means producing a detection signal indicative of said voltage level; and control means provided on said chip and supplied within said detection signal from said voltage detection means, for controlling the oscillation means such that the amplitude of the alternating current is changed in response to the detection signal, said control means increasing said amplitude of the alternating current when said voltage level of said direct current has decreased below a predetermined level, and decreasing said amplitude of the alternating current when said voltage level of said direct current has increased above said predetermined level;

said oscillation means comprising an oscillator for oscillating at a predetermined frequency, and a buffer amplifier supplied with an output of said oscillator for amplifying the same, said amplifier being driven in response to said drive voltage for producing said alternating current with the amplitude determined by said drive voltage as a result of said amplification.

2. A semiconductor integrated circuit as claimed in claim 1 in which said oscillation means has a first output terminal for producing a first alternating current having a first phase as a first component of said alternating current and a second output terminal for producing a second alternating current having a second, inverted phase as a second component of said alternating current, said rectification means comprising a charge pump circuit including a first capacitor having a first end for receiving the first alternating current from said first output terminal of said oscillation means and a second capacitor having a first end for receiving the second alternating current from said second output terminal of said oscillation means, as a second output signal of the oscillation means, first diode means having an anode connected to a second, opposite end of the first capacitor and a cathode connected to ground, second diode means having a cathode connected to said second end of the first capacitor and an anode, third diode means having an anode connected to said second, opposite end of the second capacitor and a cathode connected to ground, and fourth diode means having a cathode connected to said second end of the second capacitor and an anode connected to the anode of said second diode means at an output node, said rectification means producing said d.c. current at said output node.

3. A semiconductor integrated circuit as claimed in claim 1 in which said voltage detection means comprises a constant current source for producing a predetermined current, and a transistor connected to said constant current source, said transistor being supplied with a reference voltage and producing said detection signal at a node connected to said constant current source such that said detection signal has a magnitude that is generally proportional to a difference between said voltage level of said direct current and said reference voltage.

4. A semiconductor integrated circuit as claimed in claim 3 in which said voltage detection means further comprises threshold voltage means connected in series to said transistor for shifting said detection signal by a voltage that is pertinent to said threshold voltage means.

5. A semiconductor integrated circuit as claimed in claim 3 in which said transistor comprises a MOS transistor having a gate connected to ground for receiving the reference voltage.

6. A semiconductor integrated circuit as claimed in claim 3 in which said transistor comprises a bipolar transistor having a base connected to the ground for receiving the reference voltage.

7. A semiconductor integrated circuit as claimed in claim 1 in which said control means comprises a transistor supplied with a supply voltage for producing said drive voltage, said transistor being further supplied with said detection signal for modifying said drive voltage in response to said detection signal.

8. A semiconductor integrated circuit as claimed in claim 7 in which said transistor forming said control means comprises a MOS transistor having a gate to which said detection signal is supplied.

9. A semiconductor integrated circuit as claimed in claim 7 in which said transistor forming said control means comprises a bipolar transistor having a base to which said detection signal is supplied.

10. A semiconductor integrated circuit as claimed in claim 1 in which said voltage detection means comprises a differential amplifier circuit having first input terminal means supplied with said detection signal and second input terminal means supplied with a reference signal said differential amplifier circuit producing a control voltage in correspondence to a difference between said detection signal and said reference signal.

11. A semiconductor integrated circuit as claimed in claim 10 in which said control means comprises a MOS transistor having a source supplied with a predetermined supply voltage, a drain for producing said drive voltage, and a gate supplied with said control voltage.

* * * * *